(12) United States Patent  
Bennett

(10) Patent No.: US 10,288,156 B1  
(45) Date of Patent: May 14, 2019

(54) TRANSMISSION ASSEMBLY

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 150 days.

(21) Appl. No.: 15/615,614

(22) Filed: Jun. 6, 2017

Related U.S. Application Data

(63) Continuation of application No. 14/484,559, filed on Sep. 12, 2014, now Pat. No. 9,677,574.

(60) Provisional application No. 61/876,905, filed on Sep. 12, 2013.

(51) Int. Cl.
| | | |
|---|---|---|
| *F16H 39/42* | (2006.01) | |
| *F16H 61/40* | (2010.01) | |
| *F16H 57/02* | (2012.01) | |

(52) U.S. Cl.
CPC ............. *F16H 39/42* (2013.01); *F16H 61/40* (2013.01); *F16H 2057/02086* (2013.01)

(58) Field of Classification Search
CPC .......... F16H 39/42; F16H 61/40; F16H 61/42; F16H 2057/02086
See application file for complete search history.

(56) References Cited

U.S. PATENT DOCUMENTS

| | | | |
|---|---|---|---|
| 1,256,949 | A | 2/1918 | Sundh |
| 1,840,869 | A | 1/1932 | Rayburn |
| 1,840,873 | A | 1/1932 | Rayburn |
| 2,678,536 | A | 5/1954 | Morgan |
| 3,751,924 | A | 8/1973 | Brown et al. |
| 3,858,487 | A | 1/1975 | Abe et al. |
| 4,903,545 | A | 2/1990 | Louis et al. |
| 5,314,387 | A | 5/1994 | Hauser et al. |
| 5,592,818 | A | 1/1997 | Haag et al. |
| 6,122,996 | A | 9/2000 | Hauser et al. |
| 6,178,746 | B1 | 1/2001 | Thoma et al. |
| 6,248,037 | B1 | 6/2001 | Forster |
| 6,477,838 | B1 | 11/2002 | Thoma et al. |
| 6,983,815 | B2 * | 1/2006 | Abend ............... A01D 34/6806 180/375 |

(Continued)

FOREIGN PATENT DOCUMENTS

DE 4311501 10/1993

OTHER PUBLICATIONS

Eaton Hydrostatic Transmissions—Model 6/7, Repair Manual No. 7-403, Oct. 1988, 16 pp.
U.S. Appl. No. 15/477,932, filed Apr. 3, 2017.

*Primary Examiner* — Thomas E Lazo
(74) *Attorney, Agent, or Firm* — Neal, Gerber & Eisenberg LLP

(57) ABSTRACT

A compact hydraulic transmission assembly using an axial piston pump disposed on a center section that also provides a cylindrical running surface for a radial piston motor. This design provides for a compact and low profile assembly, while the combination of an axial piston pump with a radial piston motor provides improved efficiency for higher torque output. The radial piston motor includes a lower mass piston block that improves performance. The center section includes an extension extending outwardly from its circumference and including a check port; and a mounting lobe for securing the center section is secured to the pump housing.

20 Claims, 12 Drawing Sheets

(56) References Cited

U.S. PATENT DOCUMENTS

| | | | |
|---|---|---|---|
| 7,134,276 B1 | 11/2006 | Langenfeld et al. | |
| 7,497,082 B1 | 3/2009 | Bennett et al. | |
| 7,942,778 B2 | 5/2011 | Williames | |
| 8,464,610 B1 * | 6/2013 | Langenfeld | F16H 39/06 |
| | | | 74/606 R |
| 8,635,867 B2 | 1/2014 | Dong et al. | |
| 8,739,905 B1 * | 6/2014 | Bennett | B60K 17/28 |
| | | | 180/364 |
| 8,820,066 B1 | 9/2014 | Langenfeld | |
| 8,984,871 B1 * | 3/2015 | Probst | F15B 11/08 |
| | | | 60/387 |
| 9,610,840 B1 | 4/2017 | Langenfeld | |
| 9,677,574 B1 * | 6/2017 | Bennett | F16H 39/14 |
| 9,862,268 B1 * | 1/2018 | Bennett | F16H 9/26 |
| 2015/0323051 A1 | 11/2015 | Simon et al. | |

* cited by examiner

TRANSMISSION ASSEMBLY

CROSS REFERENCE

This application is a continuation of U.S. patent application Ser. No. 14/484,559, filed on Sep. 12, 2014, which claims the benefit of U.S. Provisional Patent Application 61/876,905, filed Sep. 12, 2013, which is incorporated herein in its entirety.

BACKGROUND OF THE INVENTION

This invention relates to hydraulic pumps and motors used to transmit rotational force from a prime mover to an output. Such devices may be used in applications including but not limited to zero-turn mowers, fan drives and the like.

SUMMARY OF THE INVENTION

This invention discloses a compact hydraulic transmission assembly using an axial piston pump disposed on a center section that also provides a cylindrical running surface for a radial piston motor. This design provides for a compact and low profile assembly, while the combination of an axial piston pump with a radial piston motor provides improved efficiency for higher torque output. The radial piston motor includes a lower mass piston block that improves performance.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
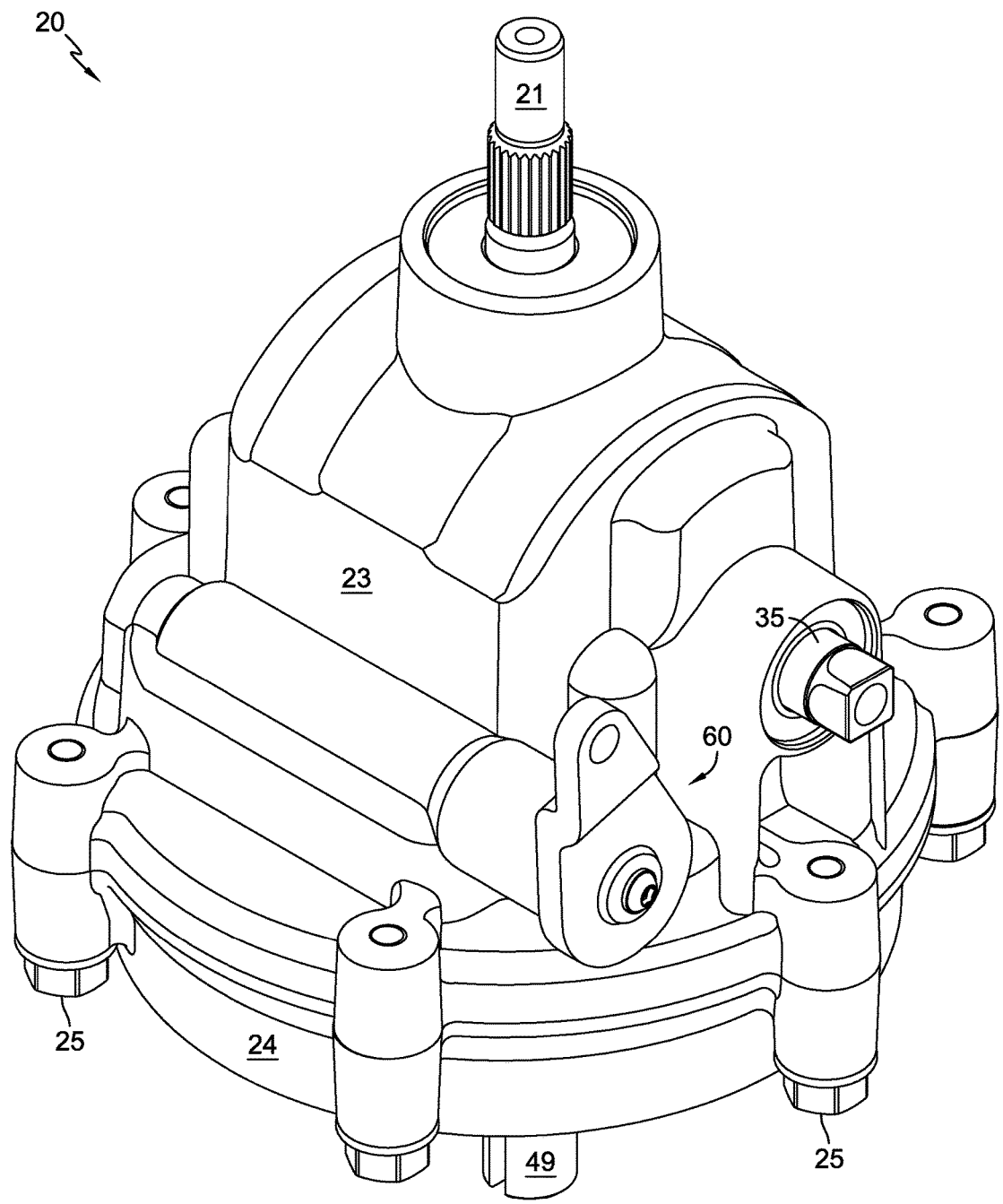
FIG. 1 is a perspective view of a transmission assembly in accordance with the principles disclosed herein.
Figure 2:
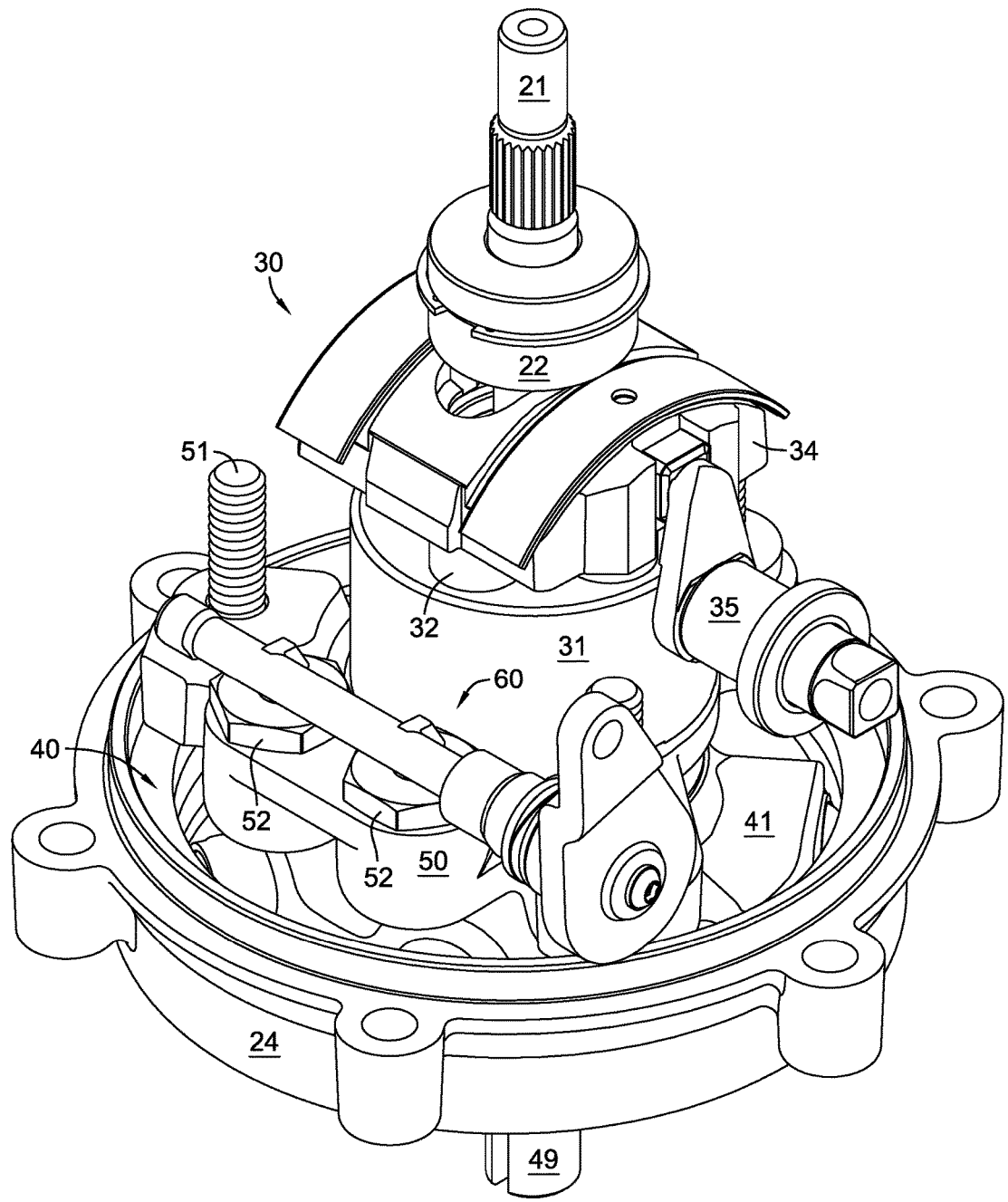
FIG. 2 is a perspective view similar to FIG. 1 with the pump housing removed.
Figure 3:
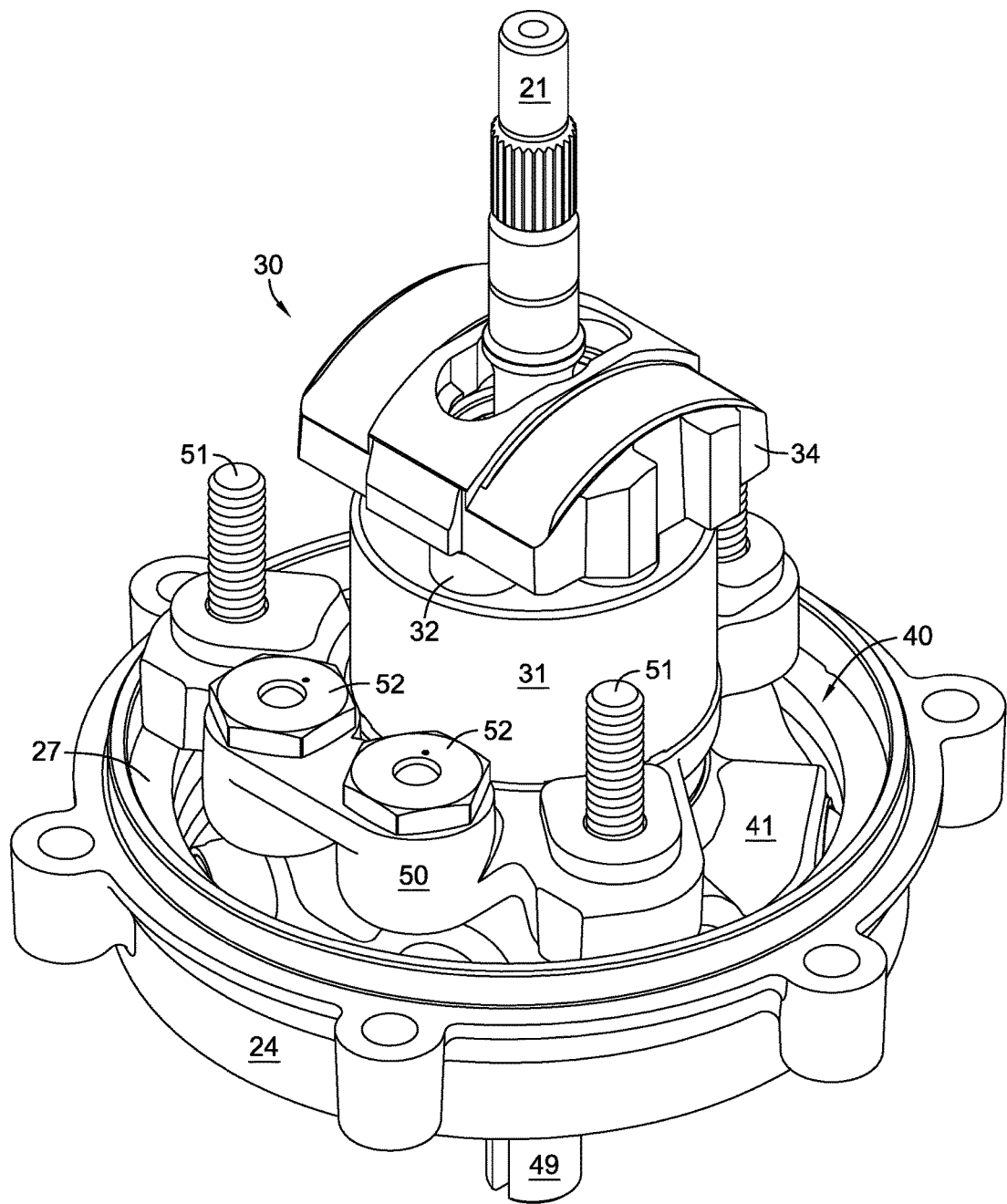
FIG. 3 is a perspective view similar to FIG. 2 with certain internal components removed to further illustrate additional structure.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art. The use of various fasteners depicted herein is illustrative only and it will be understood by those of skill in the art that other means of securing the components could be alternatively used.

Transmission assembly 20 comprises a first portion, or pump housing 23, secured to a second portion, or motor housing 24, by means of a series of fasteners 25 to form an internal sump 29 in which center section 50 is secured by a series of fasteners 51. Center section 50 includes a plurality of mounting lobes 50r that extend outwardly therefrom to receive fasteners 51. Transmission assembly 20 may be connected to an external expansion tank (not shown) by means of a port (not shown) formed on an external surface thereof.

Pump 30 comprises a rotatable cylinder block 31 disposed on a pump running surface 50a, and a plurality of pump pistons 32 are disposed in cylinder block 31 in a known manner. Pump input shaft 21 extends into pump housing 23 through support bearing 22 to engage and rotatably drive cylinder block 31. Pump input shaft 21 has one end 21a supported in bore 50g formed in center section 50. Pump 30 also comprises a thrust bearing 33 disposed in a swash plate 34, which has a trunnion arm 35 engaged thereto to rotate swash plate 34 and control output of pump 30 in a known manner. Trunnion arm 35 extends out of pump housing 23.

Center section 50 has fluid porting formed therein comprising fluid passages 50c connecting pump ports 50b on pump running surface 50a to motor ports 50d, described in more detail below. A cylindrical motor running surface 50q is formed on pintle 50h that extends from the bottom of center section 50, as seen in, e.g., FIG. 11. The motor ports 50d are formed on running surface 50q to hydraulically connect radial piston motor 40 to fluid passages 50c and thus to pump 30. Ribs 50e provide further structural support.

Figure 12:
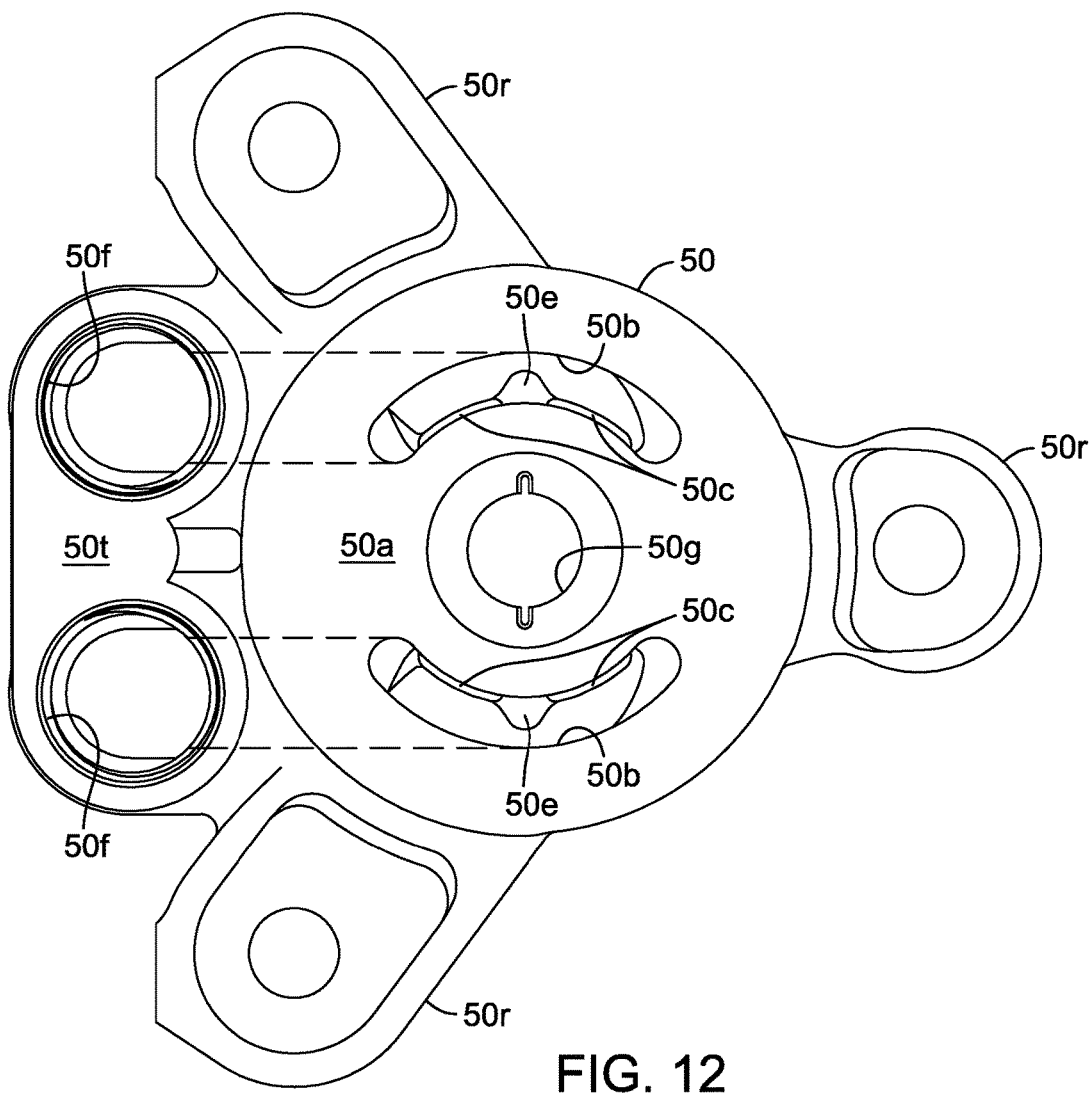
FIG. 12 is a top plan view of the center section of the transmission assembly.

As seen in FIG. 12, the arrangement of mounting lobes 50r around the circumference of center section 50 in a "Y" shape provides for a particularly compact design. Check plug ports 50f are formed in an extension 50t located between the two arms of the "Y" shape formed by lobes 50r and act to connect fluid passages 50c to sump 29. Check plugs 52 are mounted in ports 50f and are located on the top surface of center section 50 (i.e., the same side as the pump running surface 50a) to provide for a more compact unit. A rotary bypass 60 extends out of the pump housing 23 and enables the user to open the check plugs 52 to place the unit into bypass mode.

Radial piston motor 40, as can be seen in FIGS. 7-11, comprises an output hub 47 that is press-fit into or otherwise mechanically engaged to a piston block 41 having a plurality of piston bores 41a formed therein to receive the respective pistons 42. This mechanical engagement results in a sealed joint between hub 47 and piston block 41 to prevent leakage of hydraulic fluid through this joint.

Piston block 41 has a series of enlarged areas 41d formed to accept pistons 42. Enlarged areas 41d are connected by thinner webs 41e to form an undulating profile that reduces material mass. This reduction in material mass reduces cost and provides less running inertia.

Figure 4:
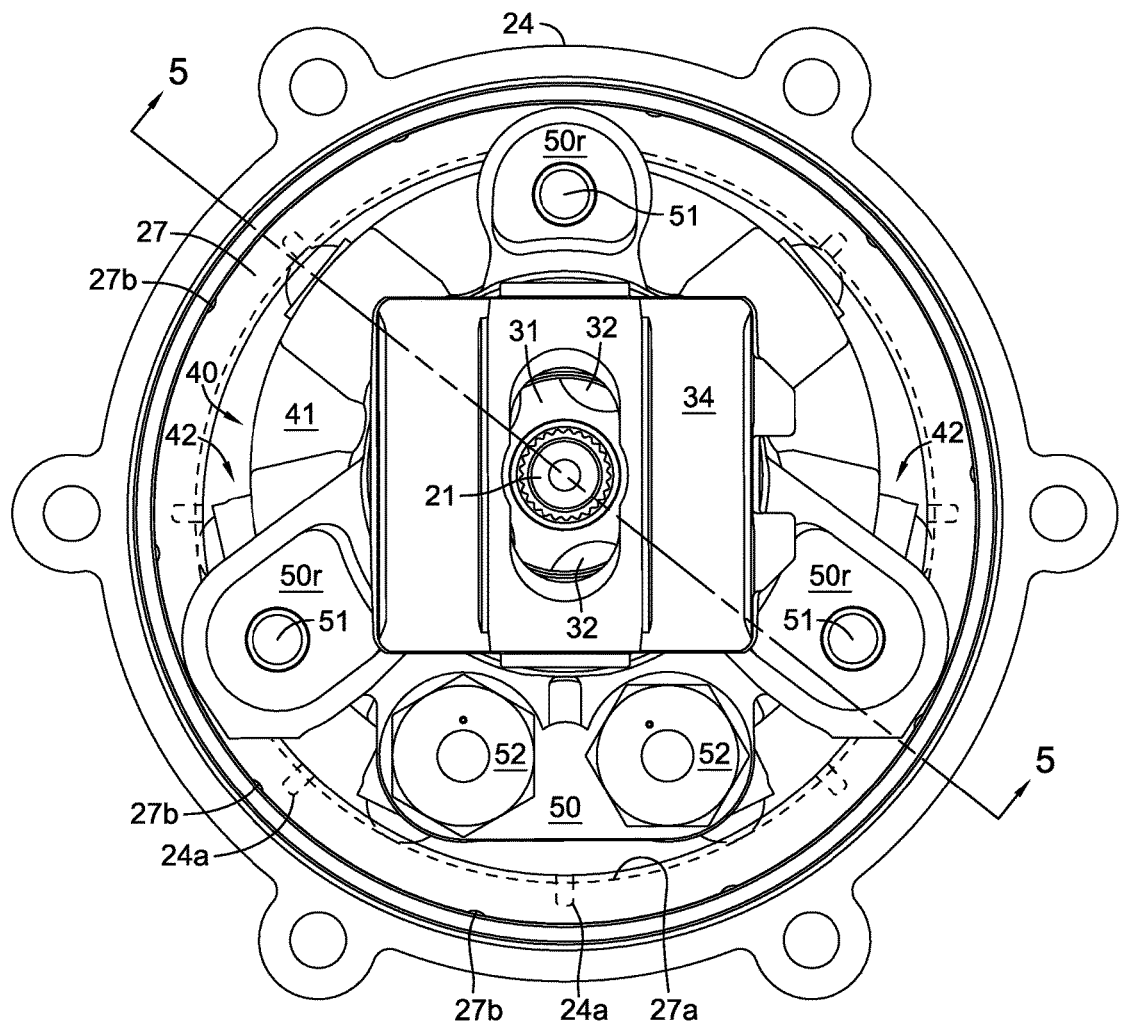
FIG. 4 is a top plan view of the internal assembly as shown in FIG. 3.
Figure 5:
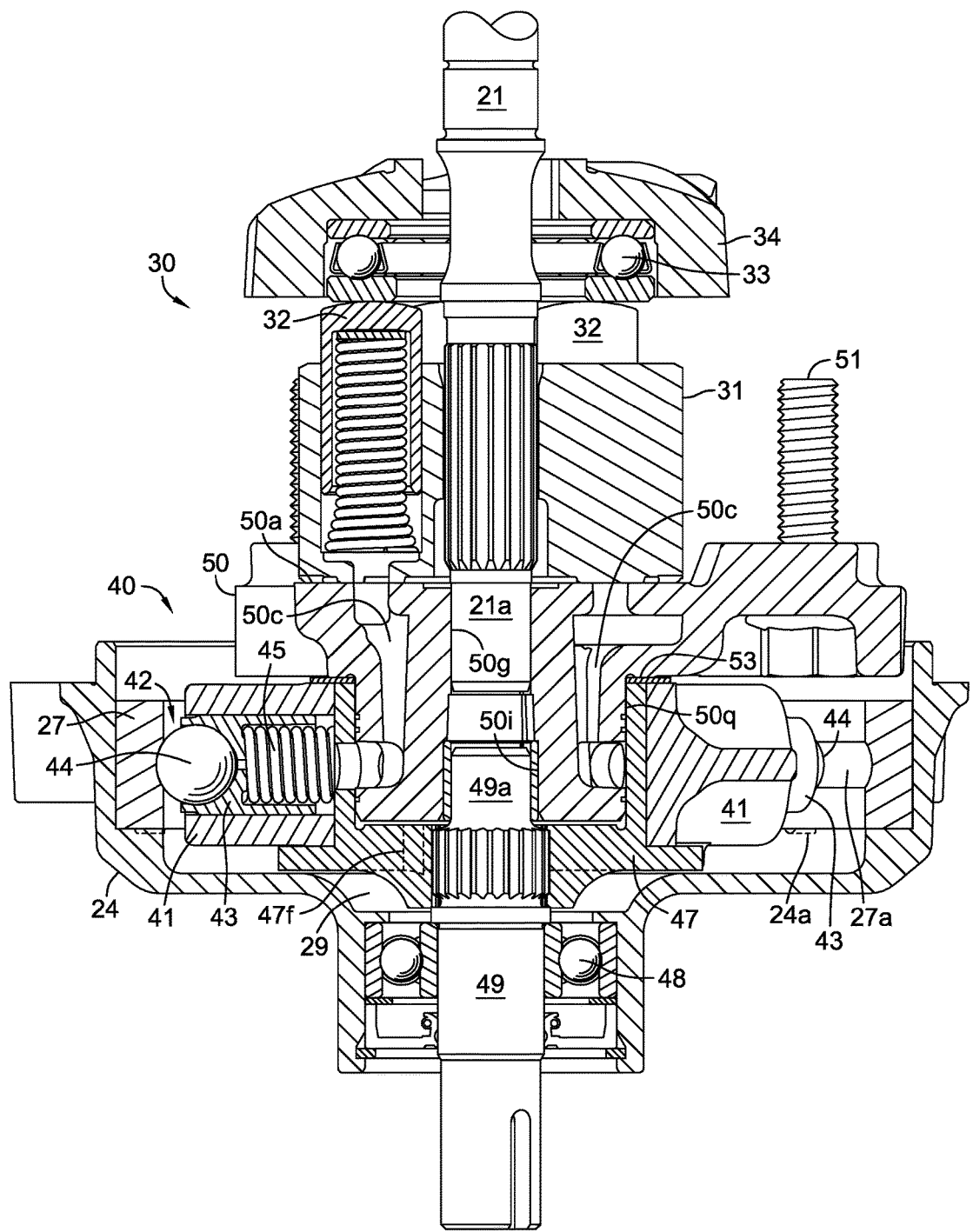
FIG. 5 is a sectional view along the line 5-5 in FIG. 4.
Figure 6:
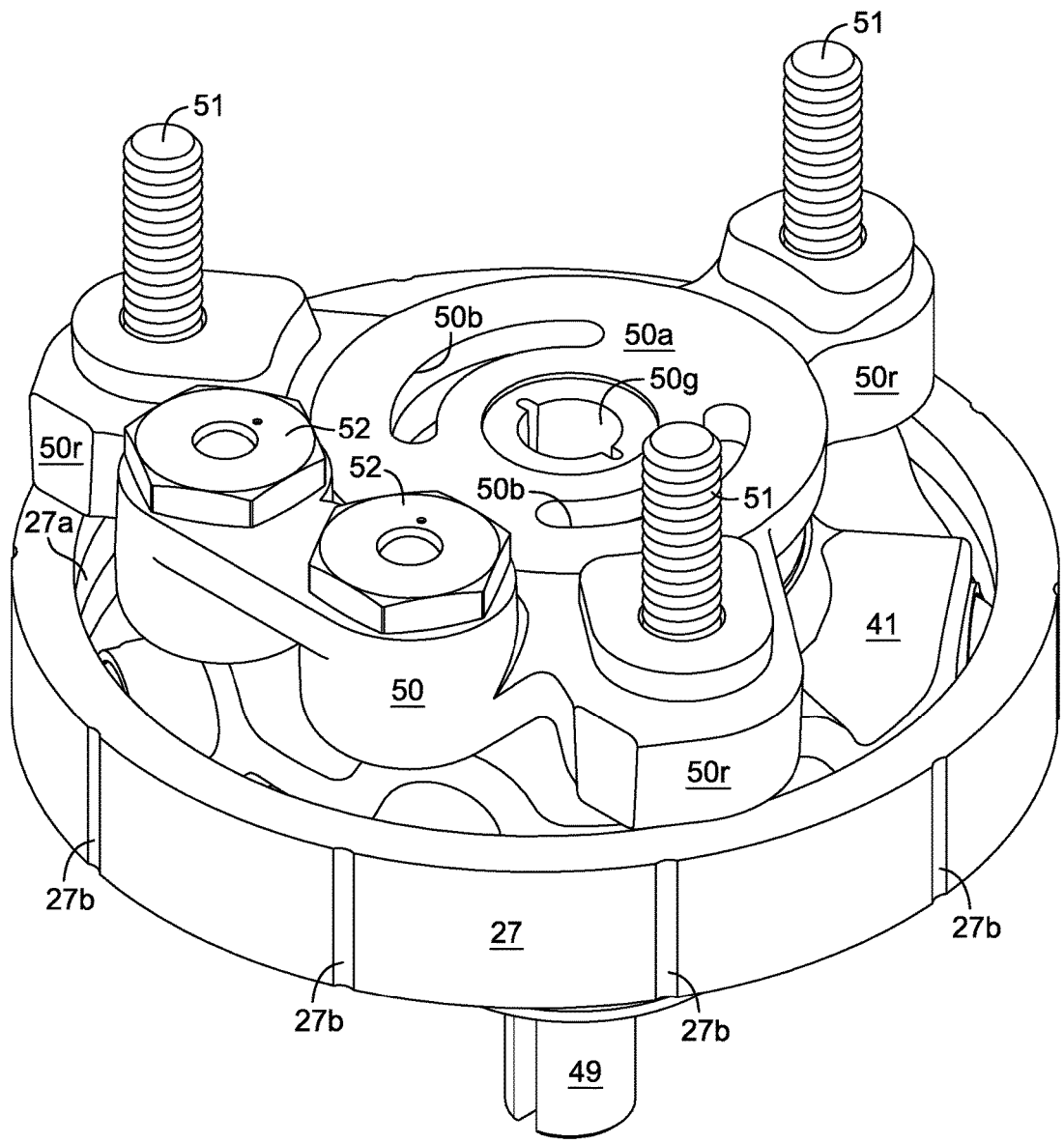
FIG. 6 is a perspective view of certain internal components of the transmission assembly.
Figure 7:
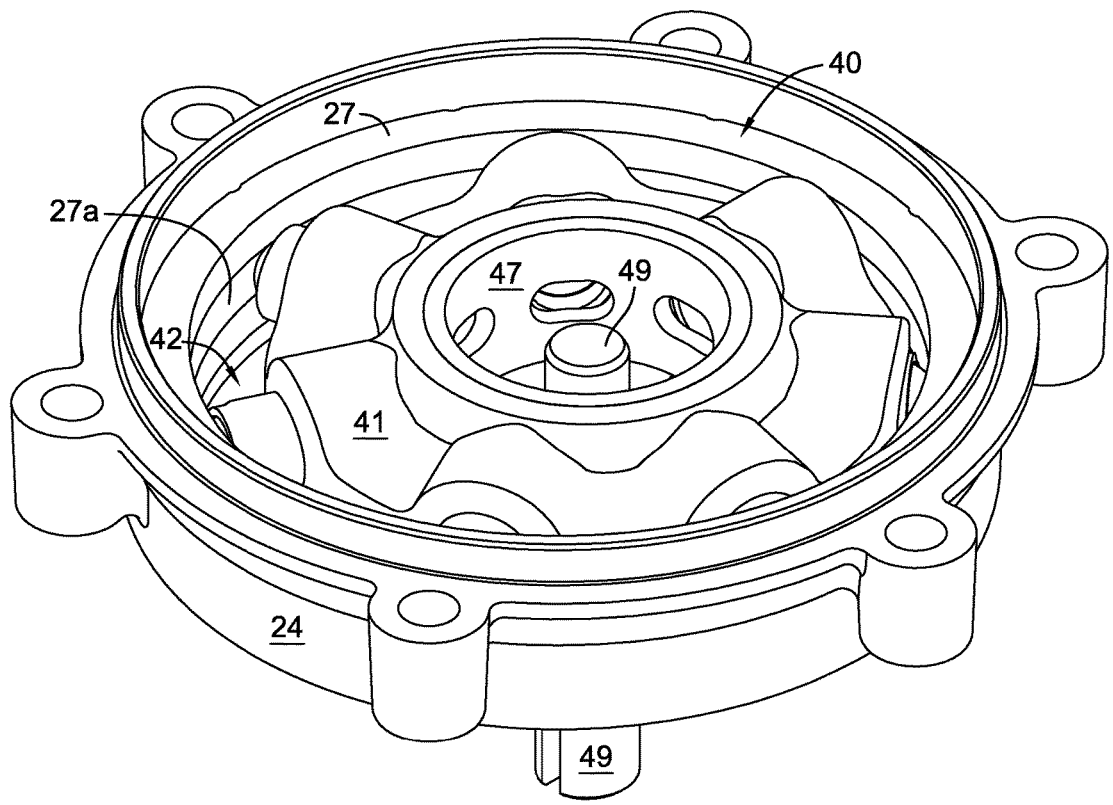
FIG. 7 is a perspective view of the motor housing along with certain components of the transmission assembly.
Figure 8:
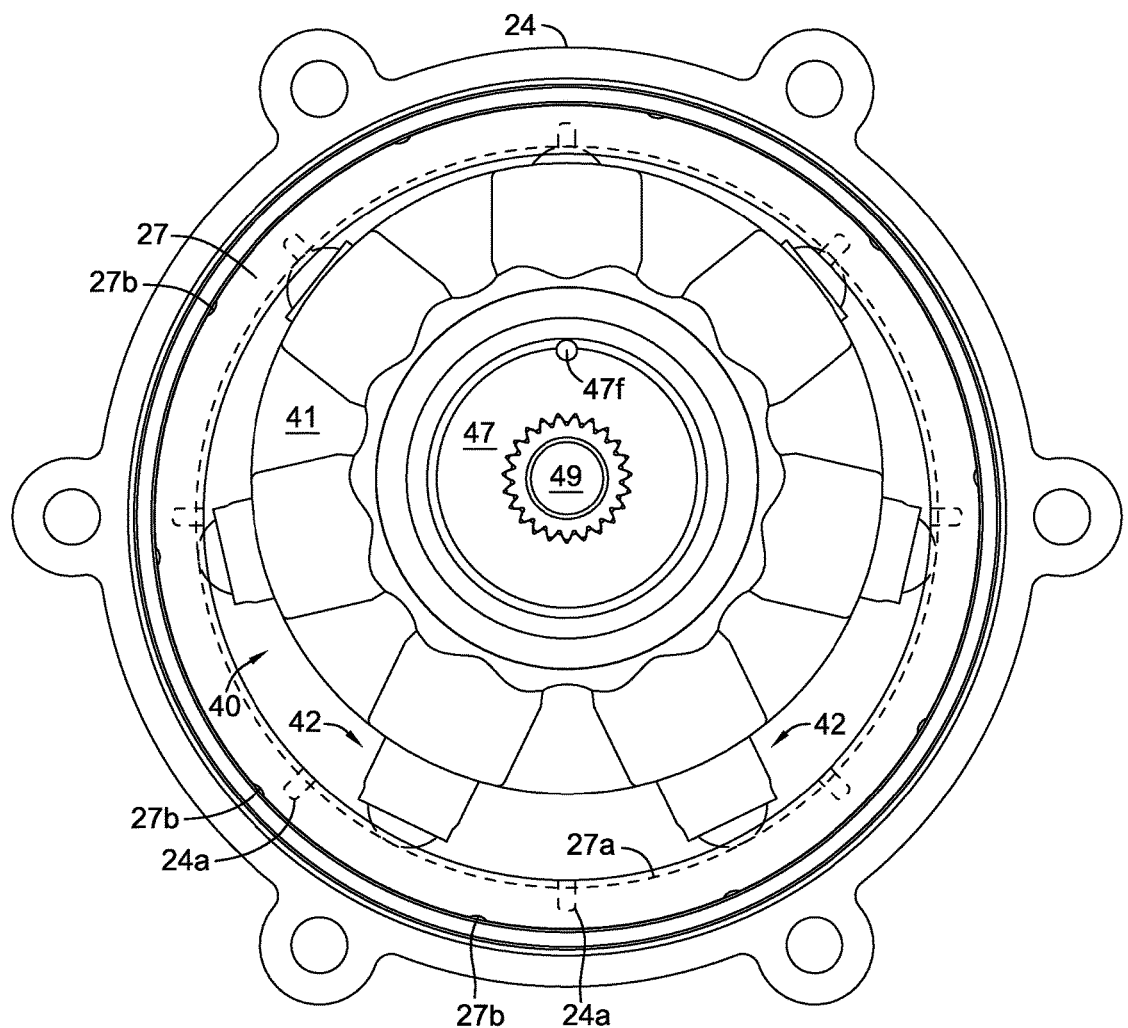
FIG. 8 is a top plan view of the motor housing and certain components shown in FIG. 7.
Figure 9:
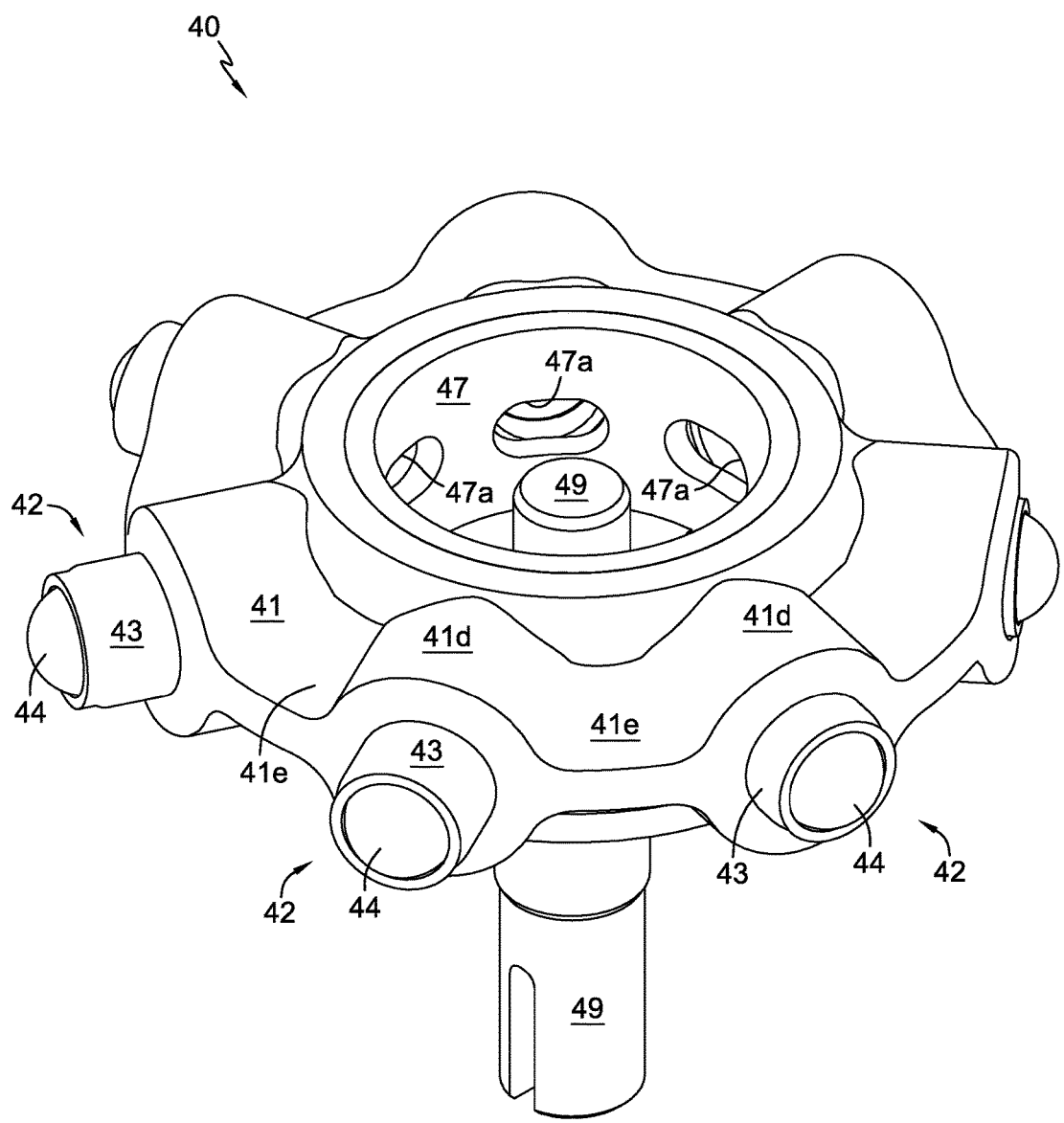
FIG. 9 is a top perspective view of the radial piston motor and output shaft.
Figure 10:
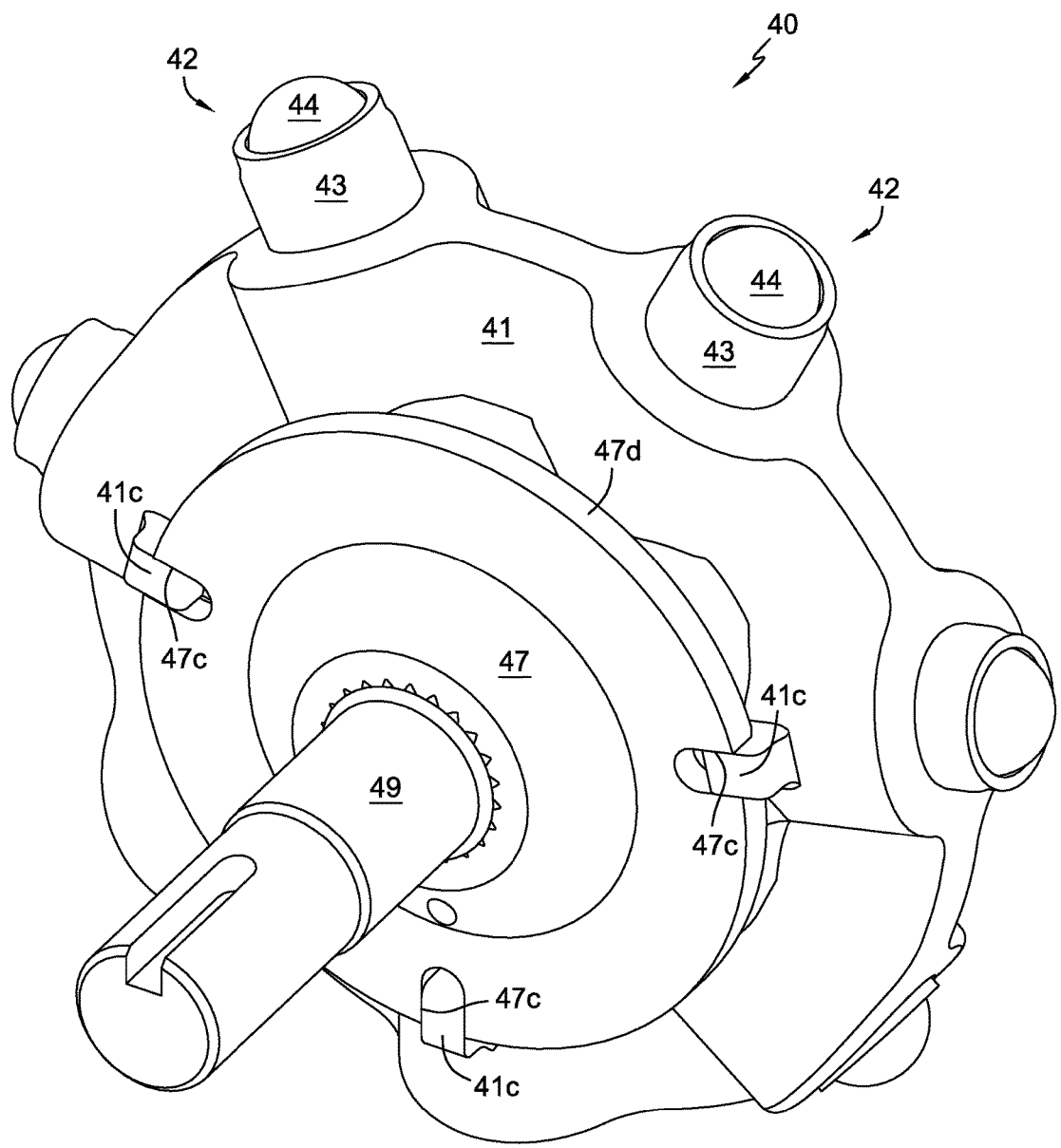
FIG. 10 is a bottom perspective view of the radial piston motor and output shaft of FIG. 9.

Each piston 42 comprises a piston body 43 engaged to piston spring 45 and having piston ball 44 disposed therein, where piston balls 44 engage race surface 27a of the piston race ring 27, which rides in motor housing 24. As shown in, e.g., FIGS. 4 and 6, a plurality of lubrication grooves 27b may be formed in an external surface of piston race ring 27 to cooperate with lubrication grooves 24a formed in motor housing 24 to permit an oil film to develop between race ring 27 and motor housing 24 if it is desired to have race ring 27 rotate. One may also use a standard bearing in place of race ring 27, and in such an embodiment standard bull nose pistons could be used.

Motor output shaft 49 is driven by motor 40 and supported in motor housing 24 by a bearing 48, and the internal end 49a extends into and is supported by bore 50i of center section 50. Output hub 47 has a flange portion 47d and cylindrical structure 47b extending therefrom and extending into and supported by bore 41b of the motor piston block 41. Fluid openings 47a are formed in hub 47 to permit fluid communication between fluid passages 50c and piston bores 41a as seen in, e.g., FIG. 11. A pressure relief passage 47f is provided to permit fluid discharge to sump 29 to avoid pressure buildup below hub 47.

Flange portion 47d includes a plurality of slots 47c formed therein. Output hub 47 is aligned to piston block 41 by means of piston block tabs 41c engaged to slots 47c as shown in, e.g., FIGS. 10 and 11. In the event of mechanical joint slippage, tabs 41c engaged to slots 47c can maintain alignment of piston block 41 with hub 47 while driving hub 47. Splines 47e on hub 47 engage with splines 49b on output shaft 49 to transmit rotational force of motor piston block 41 to output shaft 49.

Thrust washer 53 is disposed between motor piston block 41 and the bottom of center section 50 where it is supported by land 50p.

Figure 11:
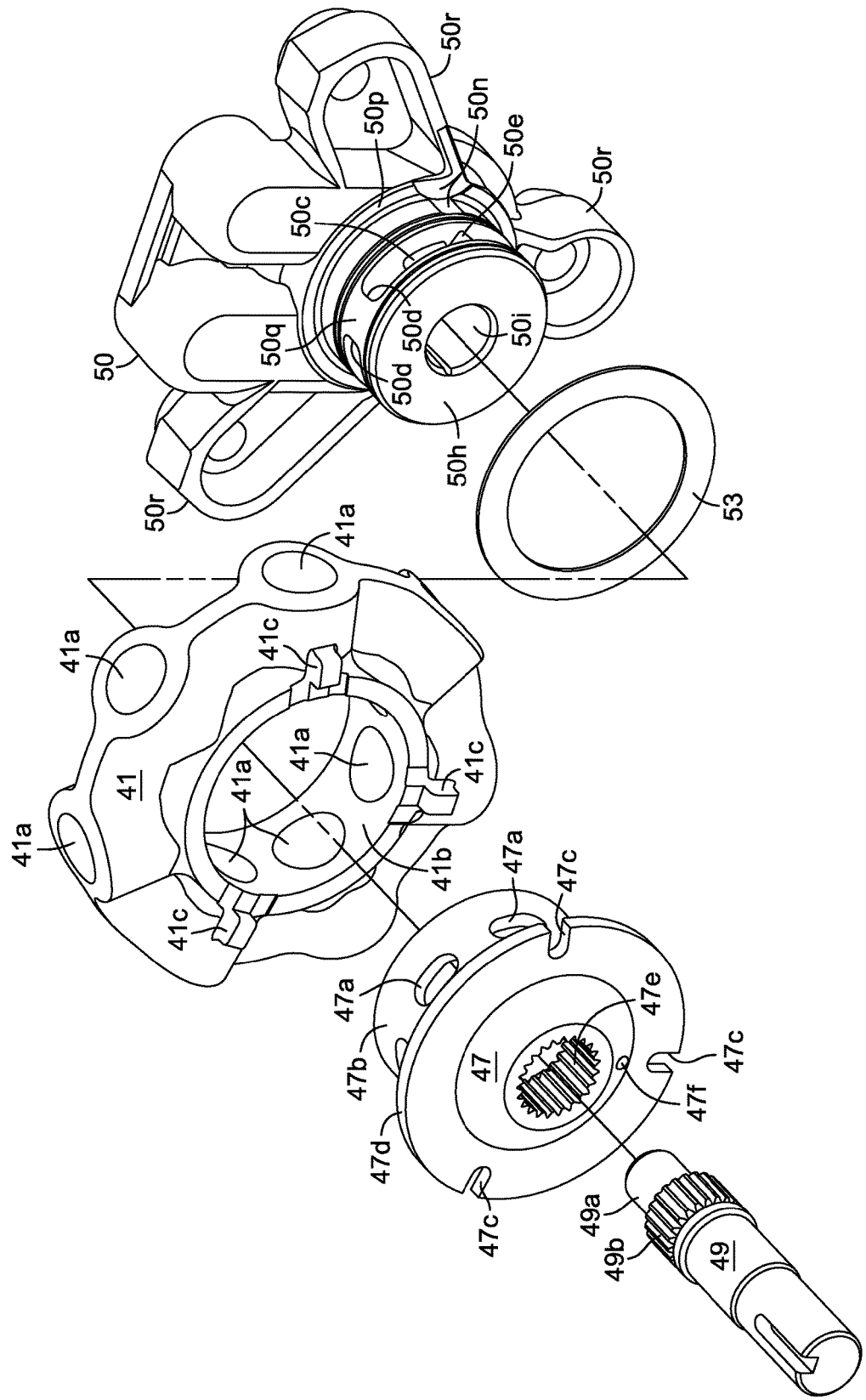
FIG. 11 is an exploded bottom perspective view of certain components of the transmission assembly.

Various pressure relief structures may be machined into center section 50. For example, as shown in FIGS. 11 and 13, a pressure relief groove 50n is formed into the bottom surface of center section 50 and extends onto adjacent pintle 50h to intersect with low pressure groove 50m.

Figure 13:
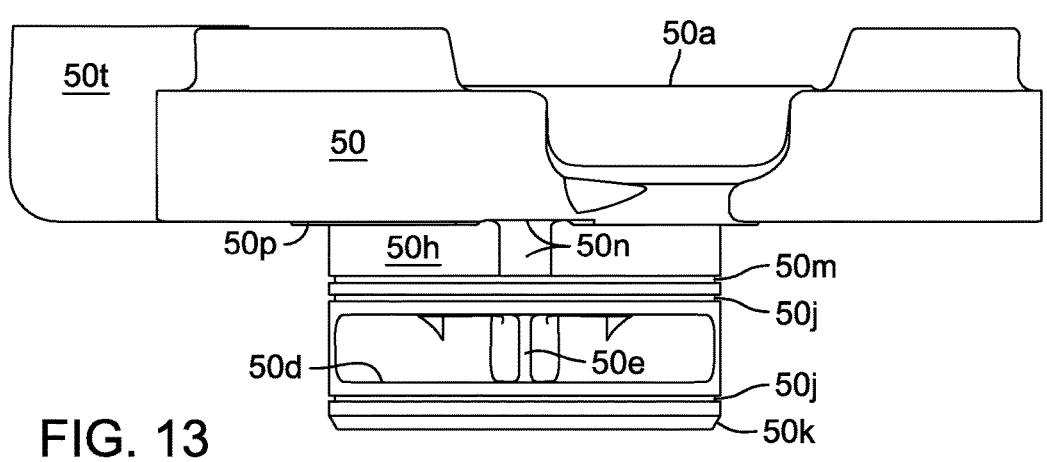
FIG. 13 is a side elevational view of the center section of FIG. 12.

Referring to FIG. 13, two high pressure grooves 50j are provided on running surface 50q, one above and one below the motor ports 50d, to create a high pressure fluid band about pintle 50h that causes hydrodynamic centering of radial piston motor 40 thereon. Additionally, a low pressure groove 50m and a low pressure chamfer 50k are formed, respectively, above and below the high pressure grooves 50j to define this high pressure fluid band and provide balance between radial piston motor 40 and pintle 50h. Low pressure chamfer 50k communicates with the aforementioned pressure relief passage 47f.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A transmission assembly comprising:
a pump housing; and
a center section disposed in the pump housing, the center section comprising:
a running surface having a circumference;
a mounting lobe extending outwardly from the circumference and having an opening substantially perpendicular to the running surface, the mounting lobe engaged with the pump housing; and
an extension extending outwardly from the circumference and including a check plug port substantially perpendicular to the running surface.

2. The transmission assembly of claim 1, wherein the mounting lobe is one of a plurality of mounting lobes engaged with the pump housing.

3. The transmission assembly of claim 2, wherein the extension is disposed between two of the plurality of mounting lobes.

4. The transmission assembly of claim 2, wherein the plurality of mounting lobes are offset from one another in a "Y" shape.

5. The transmission assembly of claim 1, further including a check plug in the check plug port.

6. The transmission assembly of claim 5, further including a bypass shaft engaged with the check plug and extending through the pump housing.

7. The transmission assembly of claim 1, further including a motor housing engaged with the pump housing to form a common sump between the pump housing and the motor housing.

8. The transmission assembly of claim 7, further including a motor shaft extending through the motor housing and supported by the center section.

9. The transmission assembly of claim 1, wherein the center section includes a low pressure chamfer.

10. The transmission assembly of claim 9, further including a radial piston motor rotatably engaged with the center section, the radial piston motor including a pressure relief passage in fluid communication with the low pressure chamfer.

11. A transmission assembly comprising:
a pump housing; and
a center section having a circumference, the center section further comprising:
a mounting lobe having an opening and extending radially from the circumference; and
an extension having a check port and extending radially from the circumference;
wherein the center section is secured in the pump housing via the mounting lobe and the check port is substantially parallel to the opening.

12. The transmission assembly of claim 11, wherein the mounting lobe is one of a plurality of mounting lobes offset from one another in a "Y" shape and the extension is disposed between two of the plurality of mounting lobes.

13. The transmission assembly of claim 11, further including a check plug in the check port and a bypass shaft engaged with the check plug and extending through the pump housing.

14. The transmission assembly of claim 11, further including a motor housing engaged with the pump housing to form a common sump between the pump housing and the motor housing.

15. The transmission assembly of claim 14, further including a motor shaft extending through the motor housing and supported by the center section.

16. The transmission assembly of claim 11, wherein the center section includes a low pressure chamfer and further including a radial piston motor rotatably engaged with the center section, the radial piston motor including a pressure relief passage in fluid communication with the low pressure chamfer.

17. A center section for use in a transmission assembly, the center section comprising:

a running surface having a circumference;
an extension extending outwardly from the circumference and including a check port; and
a mounting lobe extending outwardly from the center section and having an opening substantially parallel to the check port, wherein the center section is secured in a pump housing via the mounting lobe.

18. The center section of claim 17, wherein the mounting lobe is one of a plurality of mounting lobes offset from one another in a "Y" shape and the extension is disposed between two of the plurality of mounting lobes.

19. The center section of claim 17, further including a motor housing engaged with the pump housing to form a common sump between the pump housing and the motor housing.

20. The center section of claim 19, further including a motor shaft extending through the motor housing and supported by the center section.

* * * * *